US007979396B1

(12) United States Patent
Krishnamurthy et al.

(10) Patent No.: US 7,979,396 B1
(45) Date of Patent: Jul. 12, 2011

(54) SYSTEM AND METHOD FOR PERFORMING CONSISTENT RESYNCHRONIZATION BETWEEN SYNCHRONIZED COPIES

(75) Inventors: Raghu Krishnamurthy, Santa Clara, CA (US); Arvind Arun Pande, Pune (IN); Deepak Tawri, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 236 days.

(21) Appl. No.: 11/167,954

(22) Filed: Jun. 28, 2005

(51) Int. Cl.
*G06F 7/00* (2006.01)
*G06F 17/00* (2006.01)
(52) U.S. Cl. ........................................................ 707/655
(58) Field of Classification Search ................... 707/204, 707/655, 999.204
See application file for complete search history.

(56) References Cited

U.S. PATENT DOCUMENTS

| 5,737,601 | A | * | 4/1998 | Jain et al. ....................... 707/201 |
| 5,815,649 | A | * | 9/1998 | Utter et al. ........................... 714/6 |
| 2003/0041074 | A1 | * | 2/2003 | Vasudevan et al. .............. 707/204 |
| 2004/0143639 | A1 | | 7/2004 | Rangan et al. ................... 709/212 |
| 2005/0251633 | A1 | * | 11/2005 | Micka et al. ..................... 711/162 |

OTHER PUBLICATIONS

Atwood, "A Guide to Understanding Veritas Volume Replicator," White Paper, Jun. 1, 2002, 1-15.*
Atwood, "A Guide to Understanding Veritas Volume Replicator," White Paper, Jun. 1, 2002, 1-15.*
Blanton, "Microsoft Computer Dictionary," Microsoft Press, Fifth Edition, May 1, 2002, 61.*
*A Guide to Understanding Veritas Volume Replicator*, VERITAS Volume Replicator™ White Paper, Jun. 2002, pp. 1-15.
Bertrand, Christophe, A Technical White Paper, *Examining Hitachi Copy-on-Write Snapshot Software Capabilities for Hitachi Thunder P500™ V Series Storage Systems*, Enterprise Storage, HITACHI Data Systems, Aug. 2004, pp. 1-25.
Marks, Howard, *Storage Pipeline: Data-Replication Software, Mirror, Mirror*, Storage and Server Technology Review, May 1, 2005, pp. 1-9.
Teter, Mark, Advanced Systems Group, *Performing Oracle and SQL Server Database Recovery*, InfoStor, Magazine—Storage Device News and Trends, May 2002, pp. 1-10, http://www.virtual.com/whitepapers/ASG_Oracle_SQL_Recovery.htm.

* cited by examiner

*Primary Examiner* — Jean B. Fleurantin
*Assistant Examiner* — Aleksandr Kerzhner
(74) *Attorney, Agent, or Firm* — Campbell Stephenson LLP (57) ABSTRACT

A method involves detecting that a first storage device is inaccessible. The information stored on the first storage device is a synchronized copy of information stored on a second storage device. In response to detecting that the first storage device is inaccessible, modification logging is initiated. Modification logging involves detecting modifications to information stored on the second storage device and storing information that indicates an order in which the modifications occur to the second storage device. The stored information can indicate the order explicitly (e.g., by including a timestamp or sequence number) or indirectly (e.g., the order of entries stored in a log can indicate the order of the modifications represented by those entries). The stored information can also include the new values generated by the modifications. The stored information can then be used to resynchronize the information stored on the first and second storage devices.

20 Claims, 5 Drawing Sheets

SYSTEM AND METHOD FOR PERFORMING CONSISTENT RESYNCHRONIZATION BETWEEN SYNCHRONIZED COPIES

FIELD OF THE INVENTION

This invention relates to storage systems and, more particularly, to synchronizing copies of information stored on independent storage devices.

DESCRIPTION OF THE RELATED ART

Various information protection techniques are used to improve the availability of information. For example, mirroring and replication techniques are used to provide synchronized copies of the same information on independent storage devices. These techniques increase availability, since if one of the storage devices fails or if the copy of the information stored on one of the storage devices is corrupted, another copy will still be available from another storage device.

Mirroring involves storing a synchronized copy of the same information on each of several plexes or other storage devices. Whenever an application performs an operation that modifies information on a mirrored device, the modification is applied to all of the storage devices. The operation will not complete until the modification has been applied to all of the storage devices. Mirroring is typically performed using storage devices within the same storage area network (SAN).

Replication techniques are used to maintain synchronized copies of information at separate locations. For example, replication can be used to maintain copies of information at several different sites within a corporation's campus and/or at several different campuses. If the information is replicated at different sites, and if the failure of the systems storing the information at one site is unlikely to cause the failure of the corresponding systems at another site, replication can provide increased information reliability. Thus, if a disaster occurs at one site, an application that uses that information can be restarted using a replicated copy of the information at another site.

There are many situations in which synchronized copies (e.g., mirrors and replicas) can become unsynchronized. While the copies can be resynchronized with each other, the techniques used to resynchronize the copies often lead to one or more of the copies becoming inconsistent with the working copy (the copy currently being used by an application) for the duration of the resynchronization process. More importantly, while resynchronization is being performed, the existing techniques do not provide for a copy that is both consistent and more up to date than the time at which the copies initially became unsynchronized.

For example, due to a failure in the network that couples two sites, replicas maintained at each site can become out-of-sync with respect to each other. In order to be able to resynchronize the replicas at a later time, the working replica (the replica that is actively being used by an application) will begin tracking which portions of that replica have been modified, subsequent to the point in time at which the replicas lost synchronization. Such modifications are tracked in a bitmap or other structure, which only identifies which portions have changed (as opposed to identifying the order in which the modifications occurred).

Once communication between the sites is re-established, the modifications identified in the bitmap can be applied to the non-working replica, thus resynchronizing the replicas. Since the bitmap does not identify the order in which the modifications occurred, the modifications are unlikely to be applied to the out-of-sync replica in the same order that the modifications occurred to the working replica. As a result, until the out-of-sync replica is fully resynchronized with the working replica, the out-of-sync replica will be both unsynchronized and potentially inconsistent with respect to the working replica. The resynchronization process can actually be performed to a mirror or snapshot of the out-of sync replica, so that a consistent (but out-of-sync) version of the replica is available during the resynchronization process; however, throughout the resynchronization process, there will still not be a version of the replica that is both consistent and more up-to-date than the time at which the replica initially lost synchronization. Thus, as this example shows, it is desirable to provide improved techniques for resynchronizing out-of-sync copies such as mirrors and replicas.

SUMMARY

Various embodiments of methods and systems are disclosed for performing modification logging in response to detecting that synchronized copies have become unsynchronized. Modification logging tracks modifications to the working copy, in the order that those modifications are performed. The log created by modification logging can be used to resynchronize an out-of-sync copy. Modifications in the log are applied to the out-of-sync copy in the same order that those modifications were applied to the working copy, such that the out-of-sync copy is consistent throughout the resynchronization process. Accordingly, during resynchronization, a copy that is both consistent and more up to date than the time at which the copies became unsynchronized is available. It is noted that modification logging is selectively performed only at certain times (e.g., while the copies are unsynchronized) during the operation of the systems used to maintain the synchronized copies.

In one embodiment, a method involves detecting that a first storage device is inaccessible. The information stored on the first storage device is a synchronized copy of information stored on a second storage device. In response to detecting that the first storage device is inaccessible, modification logging is initiated. The modification logging involves detecting modifications to information stored on the second storage device and storing information that indicates an order in which the modifications occur to the second storage device. The stored information can indicate the order explicitly (e.g., by including a timestamp or sequence number) or indirectly (e.g., the order of entries stored in a log can indicate the order of the modifications represented by those entries). The stored information can also include the new values generated by the modifications.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

During normal operation of two or more storage devices that are configured to store synchronized copies, the production site (the location of the working copy that is currently being accessed by an application) can maintain a change map, which identifies which portions of the synchronized copies (these portions are referred to herein as regions, which can include blocks, extents, bytes, offsets, or other units of information) potentially differ. Each time that an application writes to or otherwise modifies the information stored by the synchronized copies, the modification may be applied to different copies at different times. For example, if the synchronized copies are mirrors, modifications can be applied to one mirror before being applied to other mirrors. During the time that the modifications to a particular region may have been applied to some but not all of the synchronized copies, the synchronized copies are potentially out of sync with each other. The change map identifies those regions that are potentially out of sync. While the change map identifies regions that may have differing values among the synchronized copies, however, the change map does not identify the new values of those regions.

If connectivity between the storage devices that implement the synchronized copies is lost (e.g., due to a network and/or device failure), changes that are applied to one synchronized copy cannot be applied to the other. If a loss of connectivity is detected, the production site begins logging modifications, which stores information associated with the modifications in a log, instead of simply identifying modifications in a change map. Modification logging is performed in such a way that the order in which the modifications occurred is identified. Additionally, modification logging can involve storing information that identifies the new value that results from each modification. When connectivity is restored, the log is used to synchronize the disconnected copy (or copies) with the copy (or copies) that did not experience disruption. Logged modifications are applied to the disconnected copy in order (as indicated by the log), so that the disconnected copy is consistent with the other copies throughout the resynchronization process. The production site continues to log modifications until the copy that was disconnected has been both reconnected and resynchronized.

Figure 1:
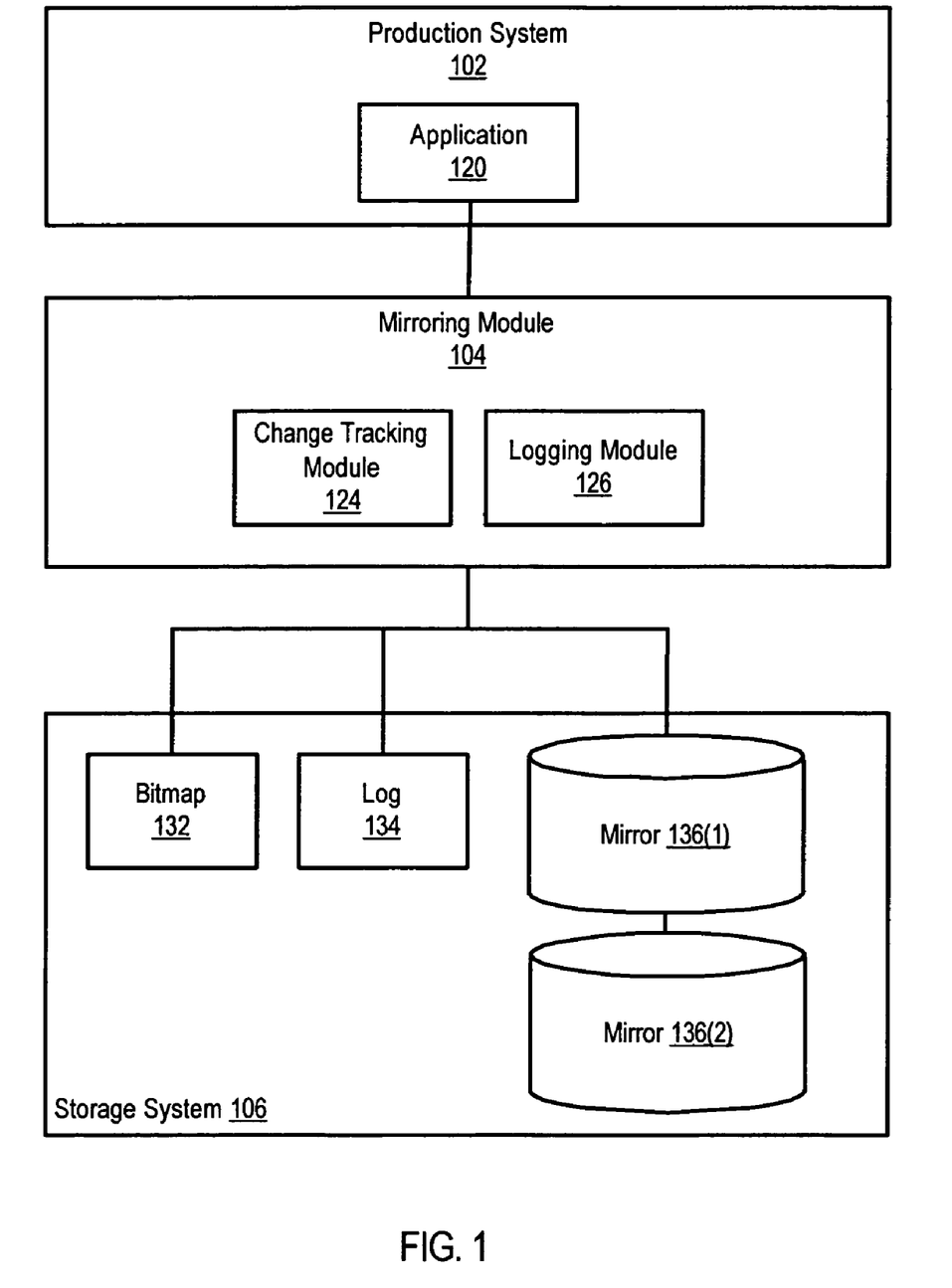
FIG. 1 is a block diagram of a system that includes a pair of mirrored storage devices, according to one embodiment of the present invention.

FIG. 1 is a block diagram of a system that performs mirroring. As shown, a production system 102 is coupled to a mirroring module 104, which implements a pair of mirrors in a storage system 106. In one embodiment, mirroring module 104 is implemented (e.g., as part of storage virtualization software, such as VERITAS Volume Manager™, available from VERITAS Software Corporation of Mountain View, Calif.) in production system 102. In other embodiments, mirroring module 104 is implemented separately (e.g., on a separate computing device, storage device controller, network switch, or the like).

Production system 102 includes one or more computing devices (e.g., workstations, personal computers, servers, PDAs (Personal Digital Assistants), cell phones, storage network switches, storage devices, storage array controllers, or the like) that implement (in hardware and/or software) the functionality of an application 120. Application 120 is an example of an application that accesses information stored by storage system 106. Application 120 can be any one of a variety of applications, such as a database application, a word processing application, and the like. It is noted that in some embodiments, application 120 is distributed in nature (e.g., like Oracle Parallel Server™ or Oracle RAC™, available from Oracle Corporation of Redwood Shores, Calif.). Such applications can access the same information (or files) from different production systems.

Storage system 106 includes several storage devices (e.g., disk drives, compact discs, digital video discs, or the like). These storage devices can be operated independently or as part of an array (e.g., a redundant array of independent disks, or RAID, array). Storage system 106 can also include one or more storage controllers and/or one or more network devices (e.g., storage area network, or SAN, switches).

Mirroring module 104 includes a change tracking module 124 and a logging module 126. Mirroring module 104 accesses information stored in storage system 106, including a bitmap 132, a log 134, and a pair of mirrors 136(1) and 136(2). Change tracking module 124 maintains bitmap 132, and logging module maintains log 134.

In this example, mirroring module 104 implements mirrors 136(1) and 136(2) within storage system 106. Mirrors 136(1) and 136(2) can be implemented on independent storage devices, such that the failure of one storage device will affect no more than one of the mirrors. In one embodiment, each mirror is implemented as a separate logical volume. Alternatively, the mirrors can be implemented as separate plexes of the same logical volume. During normal operation, mirrors 136(1) and 136(2) are synchronized with each other (i.e., both devices store the same information).

During normal operation, application 120 accesses (e.g., by performing operations such as reading, writing, deleting, moving, renaming, and the like) information on a logical mirrored device, which includes mirrors 136(1) and 136(2). Mirroring module 104 monitors these operations to ensure that mirrors 136(1) and 136(2) remain synchronized with each other. If an operation modifies the information that is stored in the mirror, mirroring module 104 ensures that the operation is performed to both mirrors. Once the operation has been performed to both of the mirrors, mirroring module 104 notifies application 120 that the operation has completed.

As long as both mirrors are accessible, change tracking module 124 tracks modifications that have potentially been applied to one, but not all, of the mirrors. For example, when a write operation is received from application 120, mirroring module 104 may apply the write operation to mirror 136(1) slightly before mirror 136(2). Accordingly, when the write operation is applied to mirror 136(1), change tracking module 124 updates bitmap 132 to indicate that the region that is being modified by the write operation may not be synchronized among both mirrors. For example, bitmap 132 can include a bit for each region included in the mirrors. If a particular region is potentially out of sync, the bit that corresponds to that region can be set, and if the region is not potentially out of sync, the bit that corresponds to that region is cleared (or vice versa). If a failure occurs before a modification has been applied to both mirrors, bitmap 132 can be used to identify which regions may not store the correct value and/or to identify which regions need to resynchronized. Sometime after the write has, been applied to both mirrors, change tracking module 124 can again update bitmap 132 to indicate that the region is synchronized.

While the above description describes a change tracking module that stores change tracking information in a bitmap, it is noted that other embodiments can store change tracking information in other structures. In general, change tracking module 124 stores information identifying potentially unsynchronized regions of a set of synchronized copies, but does not store both the new values of the identified regions and the order in which the identified regions have been modified.

When mirroring module 104 detects a loss of connectivity to one of the mirrors, mirroring module 104 enables logging module 126. Logging module 126 detects modifications to the surviving mirror and stores information corresponding to those changes in log 134. Log 134 can identify the region affected by the modification (e.g., by identifying a logical block address, an offset and length, filename, or the like). In one embodiment, log 134 can identify smaller granularities of information than bitmap 132 (e.g., in one embodiment, bitmap 132 identifies extents that can each include several kilobytes, while log 134 identifies blocks of several bytes each). Logging module 126 also stores the new value of the region affected by the modification to log 134. It is noted that mirroring module 104 can also disable change tracking module 124 when a loss of connectivity is detected.

Log 134 identifies the order in which a series of modifications occurred. In some embodiments, logging module 126 generates a timestamp or other information (e.g., sequence numbers or the like) to identify when a particular modification occurs, and writes this information to log 134. In other embodiments, log 134 is implemented in such a way that log 134 will inherently identify the relative order of the modifications as information identifying those modifications is written to log 134. For example, log 134 can be implemented as a first-in, first-out (FIFO) queue, such that the order of modifications is identified by the relative locations of the modifications within the queue, or temporal storage device. Temporal storage devices are logical or physical storage devices that maintain several versions of the same information, where each version is associated with the point in time at which that version was created. Information stored on a temporal storage device can thus be accessed based on both identity (e.g., address, filename, and the like) and time.

As noted above, mirroring module 104 enables logging module 126 in response to detecting a loss of connectivity with one of mirrors 136(1) and 136(2). Such a loss of connectivity can be caused by a failure of a device (e.g., a storage device used to implement one of the mirrors) or of a communications link. Connectivity loss can also be caused by a user taking one of the mirrors offline (e.g., to move one mirror to another host). While one mirror is unavailable, each time information in the remaining mirror is modified, the modifications are applied to both log 134 and the remaining mirror by logging module 126. In one embodiment, "front end" logging is implemented, such that mirroring module 104 returns an acknowledgement indicating completion of an operation generated by application 120 as soon as the modification caused by that operation has been stored in log 134. In such an embodiment, the modification can be applied to the remaining mirror after the acknowledgement is returned to the application. In other embodiments, mirroring module 104 returns the acknowledgement after the modification has been applied to the remaining mirror, or after the modification has been applied to both log 134 and the remaining mirror.

When the disconnected mirror is reconnected, mirroring module 104 begins resynchronizing the reconnected mirror with the mirror that remained available. Mirroring module 104 performs this resynchronization process by copying values from log 134 to the reconnected mirror. The values are copied to the reconnected mirror in the same order as those values were originally written to the mirror that remained available. Mirroring module 104 uses the ordering information provided by log 134 to identify the proper order of the modifications stored in the log.

While the reconnected mirror is being resynchronized, based on the values stored in log 134, application 120 can continue to modify the mirrored information. Logging module 126 will continue to log these modifications until the resynchronization process is complete (or nearly complete). Additionally, mirroring module 104 will inhibit normal mirroring until the resynchronization process is finished, so that the reconnected mirror will not become inconsistent.

Figure 2:
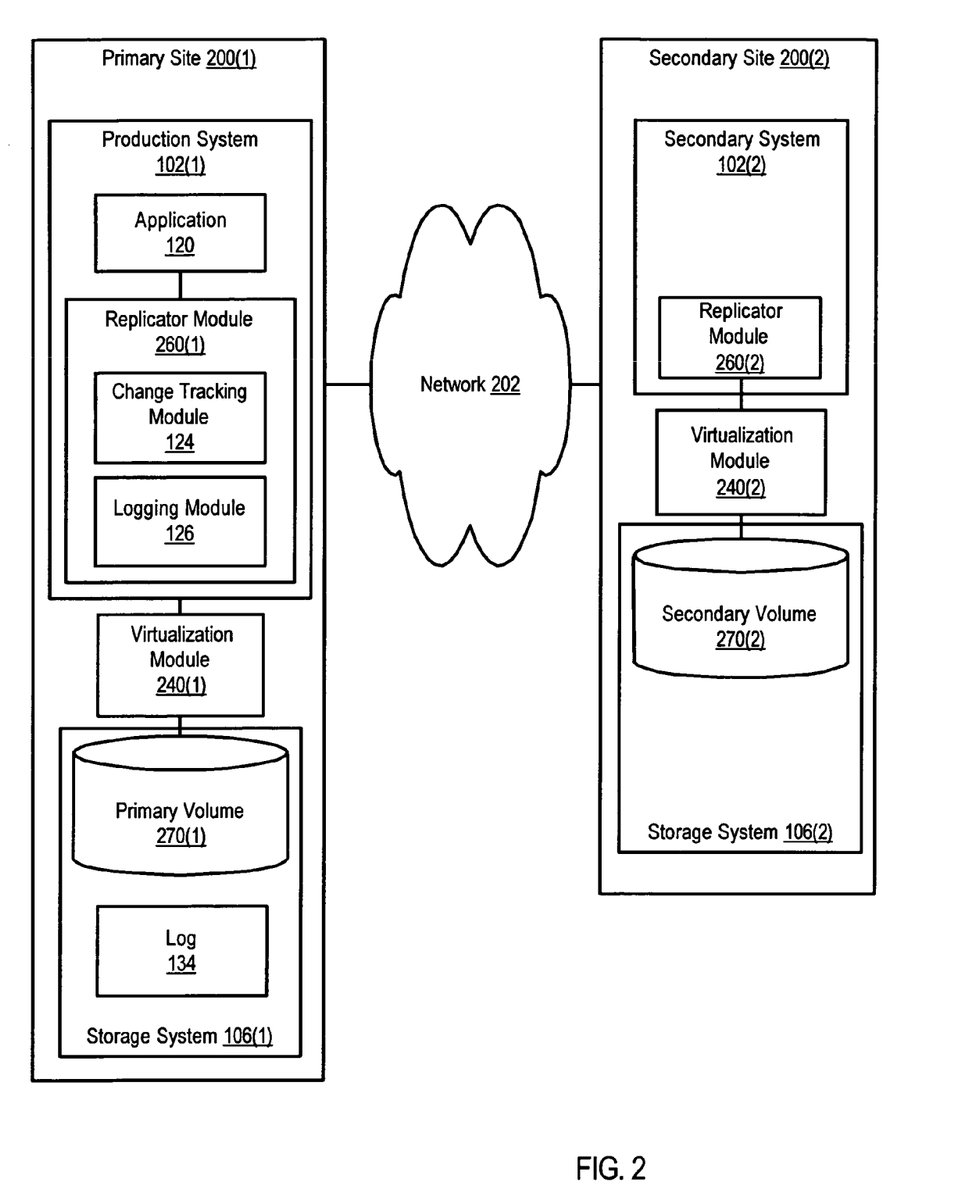
FIG. 2 is a block diagram of a system that includes a pair of replicas, according to one embodiment of the present invention.

FIG. 2 illustrates a system that performs replication. This system includes a primary site 200(1) and a secondary site 200(2). Collectively, sites 200(1) and 200(2) are referred to as sites 200. Primary site 200(1) and secondary site 200(2) are coupled by a network 202. Network 202 can include a WAN (Wide Area Network), such as the Internet, one or more LANs (Local Area Networks), and/or one or more SANs (Storage Area Networks).

Primary site 200(1) includes a production system 102(1), which implements the functionality of an application 120 and a replicator module 260(1). Primary site 200(1) also includes a virtualization module 240(1) and a primary volume 270(1). In some embodiments, virtualization module 240(1) is implemented in hardware and/or software on a network switch, network appliance, or storage device controller (e.g., an array controller). In alternative embodiments, virtualization module 240(1) is implemented in software that executes on production system 102(1). While FIG. 2 shows a situation in which replication module 260(1) is implemented in software that executes on production system 102(1), it is noted that replicator module 260(1) can alternatively be implemented in hardware and/or software on a host, network switch, network appliance, or storage device controller (e.g., an array controller). Additionally, in one embodiment, replicator module 260 (1) is implemented as part of a component such as VERITAS Volume Replicator™, available from VERITAS Software Corp., of Mountain View, Calif.

While FIG. 2 illustrates a situation in which there is a single production system with respect to information in primary volume 270(1), it is noted that in alternative embodiments, multiple production systems can be present. For example, a distributed file system (such as the cluster file system (CFS) provided by VERITAS Storage Foundation™, available from VERITAS Software Corp., of Mountain View, Calif.) can be executed on each of several different nodes within a cluster, allowing each node to act as a production system.

Secondary site 200(2) includes secondary system 102(2), which implements the functionality of replicator module 260 (2), as well as virtualization module 240(2) and a secondary volume 270(2). Like virtualization module 240(1), virtualization module 240(2) and/or replicator module 260(2) can be implemented in hardware and/or software on secondary system 102(2) or on another device (e.g., a network switch, appliance, or storage device controller). Primary system 102(1) and secondary system 102(2) of FIG. 2 can be implemented in a manner similar to production system 102 of FIG. 1.

A file system (not shown) can provide the interface via which users, such as application 120, access files on primary volume 270(1). Accordingly, the production system controls access to files on primary volume 270(1). It is noted that the production system could implement other mechanisms (e.g., databases, object-based storage, or the like) for abstracting data objects on volume 270(1) instead of and/or in addition to a file system. In general, the production system includes functionality that provides an abstraction of data to user applications and that maps abstract data objects such as files to locations on a storage device (e.g., primary volume 270(1)).

Application 120 is an example of an application that accesses files on primary volume 270(1). Application 120 can be any one of a variety of applications, such as a database application, a word processing application, and the like. It is noted that in some embodiments, application 120 is distributed in nature (e.g., like Oracle Parallel Server™ or Oracle RAC™, available from Oracle Corporation of Redwood Shores, Calif.). Such applications can access the same information from different production systems.

Virtualization modules 240(1) and 240(2) (collectively, virtualization modules 240) each create and manage one or more logical storage devices such as primary volume 270(1) and secondary volume 270(2). Each virtualization module 240 can be either in-band (e.g., the virtualization component can implemented in the data path of data being written to the volumes) or out-of-band (e.g., the virtualization component can sit outside the data path). Applications such as databases and file systems view and access the logical volumes managed by the virtualization component in the same way that the applications would view and access physical storage devices.

Replicator modules 260(1) and 260(2) at the primary and secondary sites interact to maintain a replica (a consistent copy) of information stored on primary volume 270(1) on secondary volume 270(2). Consistency ensures that, even if the secondary volume is not identical to the primary volume (e.g., updates to the secondary volume may lag behind updates to the primary volume), the secondary volume always represents a state of the primary volume that actually existed (or could have existed without violating any write-ordering rules) at a previous point in time. For example, if an application performs a sequence of writes A, B, and C to the primary volume, consistency can be maintained by performing these writes to the secondary volume in the same sequence. At no point should the secondary volume reflect a state that never actually occurred on the primary volume, such as the state that would have occurred if write C was performed before write B.

Each volume 270(1) and 270(2) can be implemented on one or more physical storage devices. As shown, primary volume 270(1) and log 134 are implemented on storage system 106(1), and secondary volume 270(2) is implemented on storage system 106(2). A physical storage device can be a single device (e.g., a single hard drive, CD (Compact Disc) drive, or DVD (Digital Versatile Disc) drive). Alternatively, a storage device may include an array of such devices (e.g., a RAID array of several hard drives controlled by a hardware array controller). Also, portions of more than one volume can be implemented on the same physical storage device. It is noted that although a logical storage volume is shown in the illustrated example, other embodiments can use similar techniques to replicate data objects (such as files) that are stored directly on a physical storage device.

During normal operation, replicator modules 260(1) and 260(2) interact with each other (e.g., by sending requests and/or data to each other via network 202 and by respectively controlling activity that affects primary volume 270(1) and secondary volume 270(2)) in order to maintain secondary volume 270(2) as a replica of primary volume 270(1). This involves detecting operations that modify values stored in primary volume 270(1), and sending information identifying those operations across network 202 so that the operations can be applied to secondary volume 270(2). Thus, during replication, incremental changes that occur to primary volume 270(1) (e.g., due to applications such as application 120 modifying, creating, and/or deleting information on primary volume 270(1)) are replicated to secondary volume 270(2).

Replicator modules 260(1) and 260(2) can also interact with each other to synchronize secondary volume 270(2) with primary volume 270(1) in situations in which the volumes are initially out of sync. The volumes are out of sync whenever the non-working volume stores information that does not correspond to the current state of the working volume (i.e., whenever secondary volume 270(2) does not store the same information as currently stored by primary volume 270(1)). In other words, the non-working volume should store a version of the working volume that is up-to-date, or nearly up-to-date (e.g., some small differences may exist due to the delays associated with transferring the most recent changes to the working volume across a network to the non-working volume). Situations in which the volumes can be out of sync include initialization, failback, and communications failures. For example, when secondary volume 270(2) is initialized as a replica of primary volume 270(1), primary volume 270(1) may already store valid application data. Accordingly, secondary volume 270(2) will not be synchronized with primary volume 270(1).

Failures, such as a network failure, and user-initiated events (e.g., such as taking a replica or site offline in order to perform maintenance) can disrupt communication between replication sites. As a result of such a communications event, the normal replication process is disrupted. Accordingly, while communications are disrupted, applications may modify primary volume 270(1), but those changes will not be replicated to secondary volume 270(2). As a result of communications disruption, the volumes may be out of sync.

Like mirroring module 104 of FIG. 1, replicator module 260(1) of FIG. 2 operates to maintain two or more synchronized, consistent copies. Replicator module 260(1) includes a change tracking module 124 and a logging module 126 that operate similarly to the modules of FIG. 1. Change tracking module 124 operates to keep track of regions of primary volume 270(1) that are potentially out of sync with respect to corresponding regions of secondary volume 270(2). For example, each time that a region of primary volume 270(1) is modified, change tracking module 124 can store information identifying that the region is potentially out of sync with a corresponding region of secondary volume 270(2). Replicator module 260(1) will also send the modification to secondary site 200(2) via network 202. When replicator module 260(2) acknowledges that the modification has been applied to secondary volume 270(2), change tracking module 124 can identify that the modified region is no longer potentially out of sync (i.e., change tracking module 124 can identify that the modified region is now synchronized). Change tracking module 124 can track potentially unsynchronized regions using a bitmap (not shown) or other suitable structure.

In response to detecting that secondary volume 270(2) is inaccessible, replicator module 260(1) enables logging module 126 (replicator module 260(1) can also disable change tracking module 124 in response to detecting that secondary volume 270(2) is inaccessible). After logging module 126 is enabled, logging module 126 stores all pending and new modifications to primary volume 270(1) in log 134 (pending modifications are those modifications that have been sent to, but not acknowledged by, secondary site 200(2)). Log 134 indicates the order in which the modifications occurred, and also indicates the new values of the regions affected by the modifications. As noted above, log 134 can be implemented as a queue, temporal storage device, or any other suitable structure that is capable of identifying the order in which the modifications occurred (e.g., by storing timestamps, by having an inherently ordered storage arrangement, or the like).

Like the logging module implemented in mirroring module 104 of FIG. 1, the logging module of FIG. 2 can also implement "front end" logging, such operations that modify primary volume 270(1) complete (as indicated to application 120) after being applied to log 134 (these operations can then be applied to primary volume 270(1) at a later time). Alternatively, logging module 126 can store modifications to log 134 after those modifications have been applied to primary volume 270(2). In such an alternative embodiment, the operations can complete either after the resulting modifications are applied to both primary volume 270(1) and log 134 or after the resulting modifications are applied to primary volume 270(1) (the modifications can be stored in log 134 after the corresponding operation completes).

In one embodiment, each time that application 120 modifies information stored on primary volume 270(1), logging module allocates a new entry in log 134. New entries can be allocated at the tail or end of the log, such that older entries are closer to the head or start of the log (in other words, the structure of the log can indicate the order of the modifications represented in the log). Logging module 134 then stores the new value of the modified portion of primary volume 270(1) in the new entry. If, for example, application 120 writes two bytes of information to primary volume 270(1), a new entry can be allocated and the two byte value written by the application can be stored in that entry.

After connectivity is restored, logging module 126 continues to log changes to primary volume 270(1). Additionally, replicator module 620(1) does not replicate changes to primary volume 270(1) to secondary volume 270(2). Replicator module 260(1) can then begin replicating the modifications, stored in log 134, to secondary site 200(2). Replicator module 260(1) sends the modifications to secondary site 200(2) in the same order that those modifications were stored in log 134. Replicator module 260(1) uses the log to identify the order of the modifications (e.g., based on information stored in the log, the structure of the log, or the like).

Once enough (e.g., all or substantially all) of the modifications in log 134 have been sent to the secondary site, replicator module 260(1) can disable modification logging and enable normal replication (e.g., instead of applying writes to log 134, replicator module 260(1) will replicate the writes normally by sending the new values being written to secondary site 200(2)).

The systems of FIGS. 1 and 2 both illustrate how both unordered change tracking and ordered logging can be used with a synchronization technique such as mirroring or replication. By selectively enabling ordered logging in response to detecting that connectivity has been disrupted (as opposed to enabling logging constantly), the amount of storage needed to implement log 134 is reduced. At the same time, by providing selective logging functionality (as opposed to simply implementing unordered change tracking), resynchronization can be performed without causing the copy that is being resynchronized to become inconsistent.

Additionally, the use of certain types of logs can support more efficient resynchronization than if a bitmap or other unordered change tracking device was being used to perform resynchronization. For example, in many situations, each bit within a bitmap corresponds to a relatively large, fixed-size region of a volume. The bit will be set if any of that region is modified. During resynchronization using the bitmap, the entire value of the region will be copied if the value of the corresponding bit indicates that the region is out of sync. Thus, if each region is 2 KB in size, 2 KB will have to be copied in order to resynchronize the region, even if the original modification only affected one byte within that region. In contrast, a log can store only the modified value. When resynchronization is performed using a log, only the modified value, which is stored in the log, will need to be copied.

In some embodiments, resynchronization uses a point-in-time copy (e.g., a snapshot or mirror) of the secondary volume. The point-in-time copy is generated before resynchronization begins. Resynchronization is performed by applying the information in log 134 to the point-in-time copy. Once the point-in-time copy has been synchronized with primary volume 270(1), using the information in log 134, the point-in-time copy can be used to synchronize secondary volume 270(2) with the primary volume (e.g., by restoring the secondary volume from the point-in-time copy). Alternatively, since resynchronization using the log generates a consistent copy, resynchronization can be performed directly to secondary volume 270(2), without the need for a point-in-time copy.

In some situations, while communications are disrupted, application 120 may generate a significant number of writes that all affect the same region of the primary volume. In such a situation, it may be desirable (e.g., based on network and/or storage efficiency concerns) to begin using unordered change tracking for resynchronization purposes. For example, instead of allocating a new log entry for each of the writes that affects that region, it may be desirable to represent the series of localized writes with a single entry in a bitmap. Additionally, when resynchronization is performed, instead of performing a new transfer over the network for each log entry, a single transfer (used to transfer the value of the region associated with the bitmap entry) can be performed. Replicator module 260(1) can be configured to detect situations involving large numbers of localized writes to primary volume 270(1) and, in response to detecting such a situation, disable logging module 126. In this situation, change tracking module 124 will continue to track modifications to primary volume 270(1) while communications are disrupted, and the bitmap generated by change tracking module 124 can be used to perform resynchronization. If logging module 126 is disabled, resynchronization will not be consistent, however, and thus a copy (e.g., a mirror or snapshot) of the secondary volume 270(2) should be used during the resynchronization process.

While FIG. 2 illustrates a system configured to replicate files on a single volume, other embodiments support replication of files from multiple volumes. In such embodiments, the group of volumes at the primary site 200(1) can be included in a primary replication volume group. Files on this primary replication volume group are then replicated to one or more volumes at the secondary site 200(2).

In some embodiments, there are multiple secondary volumes 270(2) (or replication volume groups) to which replicator module 260(1) replicates files in primary volume 270(1)

(or a primary replication volume group). Identical replication operations are typically performed to all secondary volumes.

The example of FIG. 2 shows replicator modules 260(1) and 260(2) and virtualization modules 270(1) and 270(2) as independent modules. It is noted that in alternative embodiments, the functionality of these modules can be combined and/or implemented in other ways. For example, replicator module 260(1) and virtualization module 270(1) can be combined into a single module.

Figure 3:
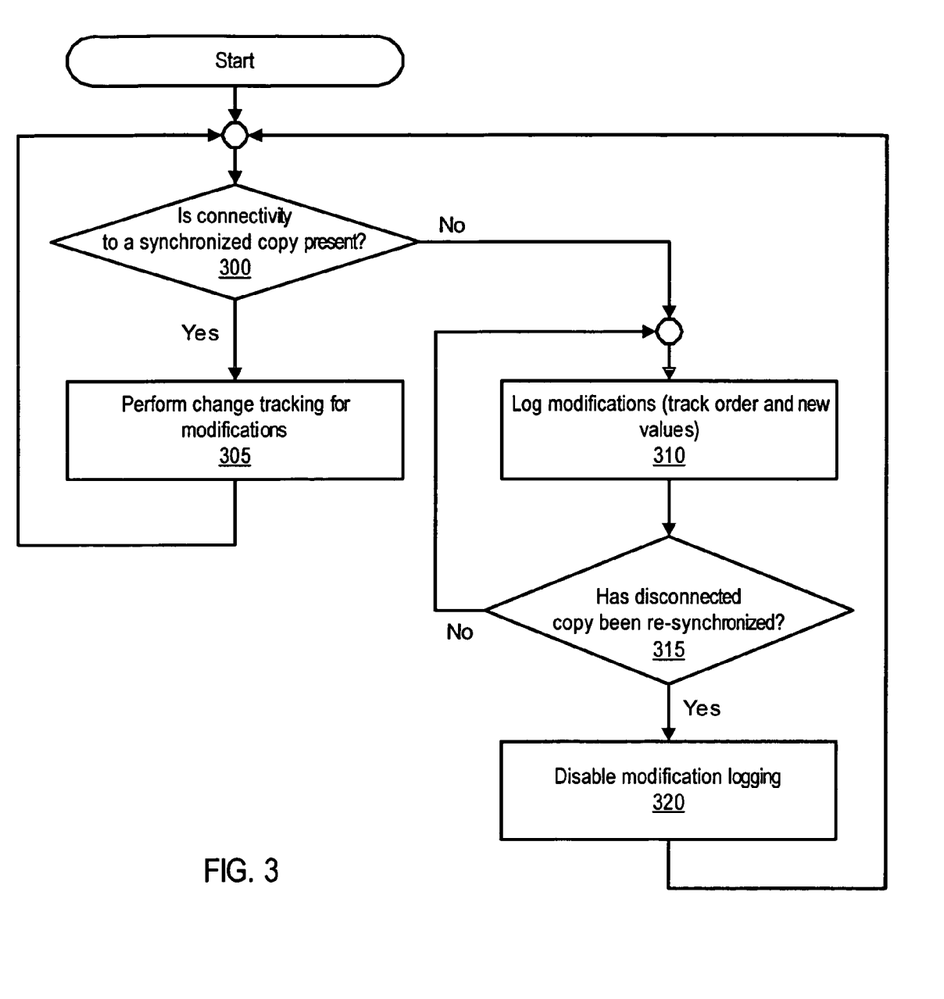
FIG. 3 is a flowchart of a method of selectively performing modification logging based on connectivity to a synchronized copy, according to one embodiment of the present invention.

FIG. 3 is a flowchart of a method of selectively performing modification logging based on connectivity to a synchronized copy. This method can be performed by a synchronization module such as mirroring module 104 of FIG. 1 or replicator module 260(1) of FIG. 2.

The method of FIG. 3 begins at 300, when connectivity with a synchronized copy is detected. The synchronized copy can be a mirror or replica. Connectivity of the synchronized copy can be disrupted for a variety of reasons, including storage device failures, network failures or congestion, and user-initiated events (e.g., such as taking a minor offline).

If connectivity with the synchronized copy is detected, change tracking is performed, as indicated at 305. Change tracking (e.g., as performed by change tracking module 124 of FIGS. 1 and 2) is a technique that identifies potentially unsynchronized regions of a set of two or more synchronized copies. Change tracking identifies neither the order in which different regions are modified nor the new values of the modified regions.

If connectivity with the synchronized copy is not detected at 300, modification logging is initiated, as indicated at 310. Modification logging involves tracking both the order of modifications to one of the copies and the new value of the modified regions of the copy.

If the disconnected copy is reconnected, the log generated by modification logging (at 310) can be used to resynchronize the reconnected copy. Modification logging continues while the resynchronization process is being performed. Once the reconnected copy is resynchronized (e.g., once all or nearly all of the modifications in the log have been applied to the reconnected copy), as determined at 315, modification logging can be disabled, as shown at 320. In some embodiments, operations 300-320 can repeat one or more times.

It is noted that in some embodiments, the operations illustrated in FIG. 3 can be combined and/or reordered. Additionally, in other embodiments, different operations can be performed instead of and/or in addition to those operations illustrated in FIG. 3.

Figure 4:
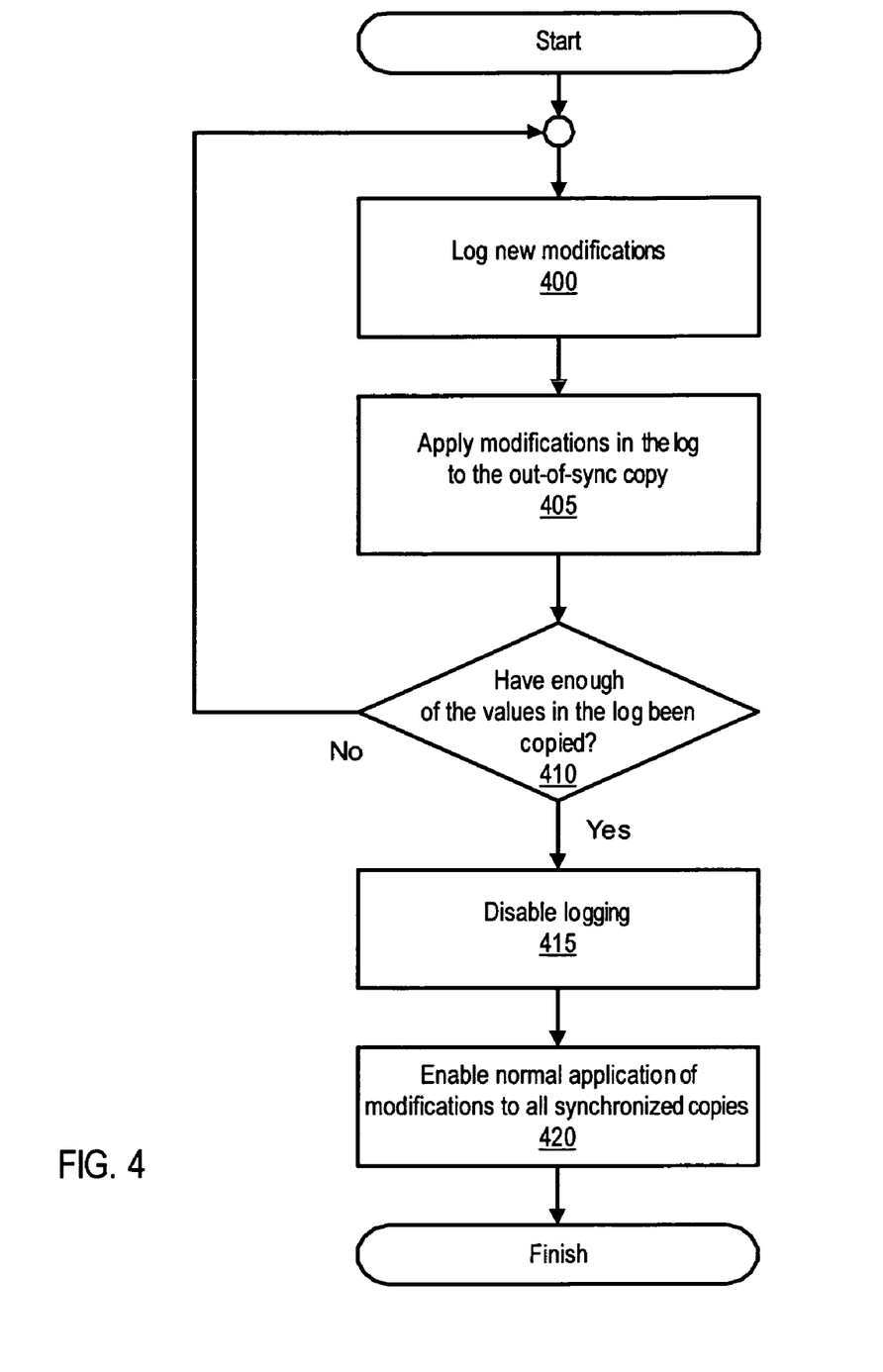
FIG. 4 is a flowchart of a method of resynchronizing a copy, according to one embodiment of the present invention.

FIG. 4 is a flowchart of a method of resynchronizing a copy. This method can be performing by a synchronization module such as a mirroring module or a replicator module. This method can be performed when a disconnected copy, which is out of sync with respect to a primary copy, is reconnected. This method resynchronizes the reconnected copy with the primary copy. The copies can be mirrors or replicas.

The method begins at 400, when new modifications (which occur after connectivity to the disconnected copy is restored) to a primary copy are logged. Thus, these modifications are stored according to the same modification logging mechanism (e.g., operation 310 of FIG. 3) that was used to track modifications while the disconnected module was unavailable. While any new modifications are being logged, the modifications that are already stored in the log are applied to the out of sync copy (i.e., the reconnected copy), as indicated at 405. Operation 405 can be performed by copying values (which represent the new values that resulted from the modifications) from the log to the reconnected copy. The values are copied in the order in which the corresponding modifications were originally performed to the primary copy.

Operations 400 and 405 repeat until enough of the modifications in the log have been applied to the reconnected copy, as determined at 410. In one embodiment, this operation is satisfied once all of the modifications in the log have been applied to the reconnected copy. In another embodiment, this operation is satisfied when substantially all of the modifications have been applied to the reconnected copy.

Once enough values have been copied to the reconnected copy, modification logging can be disabled, as indicated at 415. Normal synchronization techniques, such as mirroring and replication, can then be enabled for the reconnected and resynchronized copy, as indicated at 420.

It is noted that in some embodiments, the operations illustrated in FIG. 4 can be combined and/or reordered. Additionally, in other embodiments, different operations can be performed instead of and/or in addition to those operations illustrated in FIG. 4.

Figure 5:
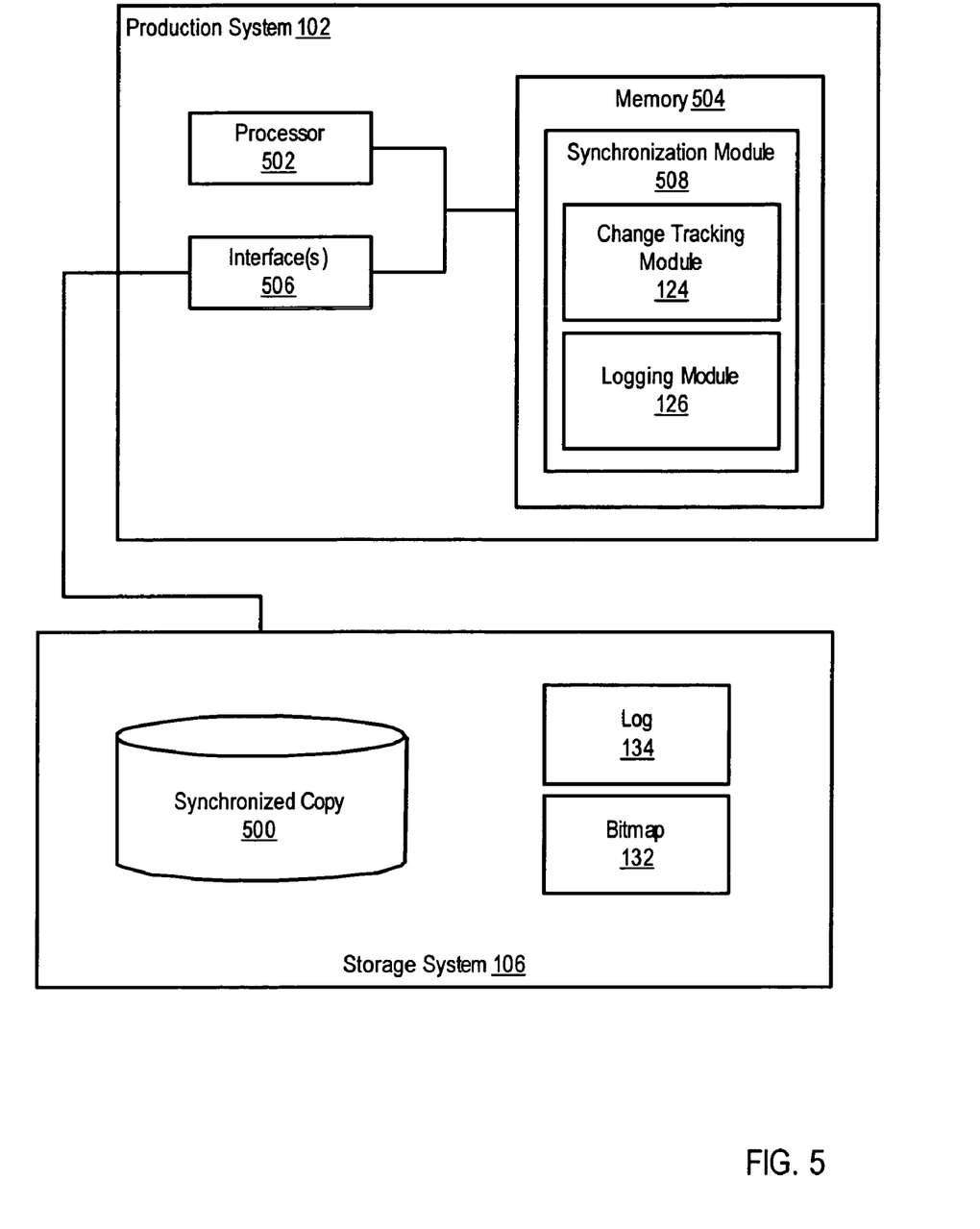
FIG. 5 is a block diagram of a computer system, according to one embodiment of the present invention.

FIG. 5 illustrates a block diagram of a computing device that is operating as a production system 102 (e.g., one of the production systems shown in FIGS. 1 and 2). As illustrated, production system 102 includes one or more processors 502 (e.g., microprocessors, PLDs (Programmable Logic Devices), or ASICs (Application Specific Integrated Circuits)) configured to execute program instructions stored in memory 504. Memory 504 can include various types of RAM (Random Access Memory), ROM (Read Only Memory), Flash memory, MEMS (Micro Electro-Mechanical Systems) memory, and the like. Production system 102 also includes one or more interfaces 506. Processor 502, interface 506, and memory 504 are coupled to send and receive data and control signals by a bus or other interconnect.

Interface 506 can include a network interface to various networks and/or interfaces to various peripheral buses. Interface 506 can include an interface to one or more storage devices. Interface 506 can also include an interface to a network, for use in communicating with other nodes and/or for use in communicating with networked storage devices.

In this example, program instructions executable to implement an instance of a synchronization module 508 are stored in memory 504. Synchronization module 508 is configured to maintain two or more synchronized copies, such as synchronized copy 500, using techniques such as mirroring and replication. Replicator module 160(1) can implement a mirroring module (e.g., mirroring module 104 of FIG. 1) or a replicator module (e.g., replicator module 260(1) of FIG. 2). Synchronization module 508 includes a change tracking module 124 and a logging module 126. As described above, change tracking module 124 can identify regions of synchronized copy 500 that are potentially out of sync with respect to another synchronized copy in bitmap 132 or another suitable structure. Logging module 126 is enabled when a loss of connectivity to one of the synchronized copies is detected. Logging module 126 stores information that indicates modifications that have been applied to synchronized copy 500. This information can be used to identify the order of the modifications, as well as the new values that result from the application of those modifications too synchronized copy 500.

The program instructions and data implementing the synchronization module can be stored on various computer readable media such as memory 504. In some embodiments, such software is stored on a computer readable medium such as a CD (Compact Disc), DVD (Digital Versatile Disc), hard disk, optical disk, tape device, floppy disk, and the like. In order to be executed by processor 502, the instructions and data implementing the synchronization module are loaded into memory 504 from the other computer readable medium. The instructions and/or data implementing the synchronization module can also be transferred to production system 104(1) for storage in memory 504 via a network such as the Internet or upon a carrier medium. In some embodiments, a computer readable medium is a carrier medium such as a network and/or a wireless link upon which signals such as electrical, electromagnetic, or digital signals, on which the data and instructions implementing a synchronization module are encoded, are conveyed.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
applying, to a first storage device, a plurality of first modifications to information stored on a second storage device;
performing change tracking, wherein the change tracking comprises
identifying regions of the first storage device that have values differing from values stored on the second storage device as a result of the first modifications without identifying the order in which different regions are modified, and
setting a bit in a bitmap for each identified region, wherein
the bitmap comprises a plurality of bits,
each bit corresponds to a respective region of the first storage device, and
the bit is cleared when the respective region corresponding to the bit is synchronized with the second storage device;
detecting that connectivity to the first storage device has been lost, wherein
modification logging is inhibited prior to the detecting;
in response to the detecting, initiating the modification logging, wherein
the modification logging continues until connectivity has been restored and the first storage device has been synchronized with respect to the second storage device,
the modification logging is performed at a smaller granularity of information than the change tracking, and
the modification logging comprises:
detecting a plurality of second modifications to information stored on the second storage device, wherein
information stored on the first storage device is a synchronized copy of the information stored on the second storage device, prior to the time at which the plurality of second modifications are applied to the second storage device, and
storing information indicating an order in which the second modifications occur to the second storage device; and
in response to the detecting, inhibiting the change tracking, wherein
the change tracking is inhibited as long as the modification logging continues.

2. The method of claim 1, wherein the storing the information indicating the order in which the second modifications occur further comprises:
storing a new value written to the second storage device in an entry in a log, wherein
an order of entries within the log identifies the order in which the second modifications occur.

3. The method of claim 2, further comprising:
detecting that connectivity to the first storage device has been restored, subsequent to detecting that connectivity to the first storage device has been lost; and
synchronizing the first storage device with respect to the second storage device, wherein the synchronizing comprises:
copying each of a plurality of values from the log to the first storage device, in the order in which the values were stored in the log.

4. The method of claim 2, wherein the modification logging further comprises
identifying regions of the first storage device that have values differing from values stored on the second storage device as a result of the plurality of second modifications to information stored on the second storage device, without identifying the order in which different regions are modified, and
storing information corresponding to the identified regions in the log.

5. The method of claim 3, further comprising:
detecting a first write operation to the second storage device, wherein
the first write operation is generated by an application, and
performance of the first write operation writes a new value to a region of the second storage device; and
waiting to signal completion of the first write operation to the application until a copy of the new value is stored in the log.

6. The method of claim 1, further comprising:
inhibiting modification logging, in response to detecting that connectivity to the first storage device has been restored and the first storage device is synchronized with respect to the second storage device.

7. The method of claim 6, further comprising:
identifying second modifications to the second storage device in a bitmap, if modification logging is inhibited.

8. The method of claim 6, wherein
the first storage device is located at a remote site,
the second storage device is located at a primary site, and
the remote site is coupled to the primary site by a network.

9. A system comprising:
a first storage device;
a second storage device, wherein information stored in the second storage device is a synchronized copy of information stored in the first storage device; and
a synchronization module coupled to the first storage device and the second storage device, the synchronization module comprising:
a change tracking module configured to perform change tracking, wherein the change tracking module is configured to
identify regions of the second storage device that have values differing from values stored on the first storage device without identifying the order in which different regions are modified, and
set a bit in a bitmap for each identified region, wherein
the bitmap comprises a plurality of bits, each bit corresponds to a respective region of the first storage device, and the bit is cleared when the respective region corresponding to the bit is synchronized with the second storage device, and a logging module configured to perform modification logging, wherein the logging module is configured to store information indicating an order in which first modifications occur to the first storage device, wherein the modification logging is performed at a smaller granularity of information than the change tracking, the logging module is enabled in response to the synchronization module detecting that connectivity to the second storage device has been lost, wherein the logging module is disabled prior to the time at which connectivity has been detected to have been lost, the logging module remains enabled until connectivity has been restored and the second storage device has been synchronized with respect to the first storage device, and the synchronization module inhibits the change tracking module and the application, to the second storage device, of second modifications to information stored on the first storage device, as long as the logging module remains enabled.

10. The system of claim 9, wherein the logging module is configured to:

store a new value written to the first storage device in an entry in a log, wherein an order of entries within the log indicates the order in which the first modifications to the first storage device occur.

11. The system of claim 10, wherein the synchronization module is configured to:

detect that connectivity to the second storage device has been restored, subsequent to detecting that connectivity to the second storage device has been lost; and synchronize the second storage device with respect to the first storage device by copying each of a plurality of values from the log to the second storage device, in the order in which the values were stored.

12. The system of claim 10, wherein the synchronization module is configured to:

disable the logging module, in response to detecting that connectivity to the second storage device has been restored and the second storage device is synchronized with respect to the first storage device.

13. A system comprising:

means for applying to a first storage device a plurality of first modifications to information stored on a second storage device;

means for performing change tracking, wherein the change tracking comprises identifying regions of the first storage device that have values differing from values stored on the second storage device without identifying the order in which different regions are modified, and setting a bit in a bitmap for each identified region, wherein the bitmap comprises a plurality of bits, each bit corresponds to a respective region of the first storage device, and the bit is cleared when the respective region corresponding to the bit is synchronized with the second storage device;

means for detecting that connectivity to the first storage device has been lost, wherein modification logging is inhibited prior to the time at which connectivity has been detected to have been lost;

means for performing the modification logging, wherein the modification logging is configured to be performed at a smaller granularity of information than the change tracking, the means for performing modification logging are enabled in response to detecting that connectivity to the first storage device has been lost, the means for performing modification logging remains enabled until connectivity has been restored and the first storage device has been synchronized with respect to the second storage device, and the modification logging comprises:

detecting a plurality of second modifications to information stored on the second storage device, wherein information stored on the first storage device is a synchronized copy of the information stored on the second storage device, prior to the time at which the plurality of second modifications are applied to the second storage device, and storing information indicating an order in which the second modifications occur to the second storage device; and means for inhibiting the means for applying and the means for performing change tracking as long as the means for performing the modification logging remains enabled, in response to detecting that connectivity to the first storage device has been lost.

14. The system of claim 13, wherein storing the information indicating the order in which the second modifications occur comprises:

storing a new value written to the second storage device in an entry in a log, wherein an order of entries within the log identifies the order in which the second modifications occur.

15. The system of claim 14, further comprising:

means for detecting that connectivity to the first storage device has been restored, subsequent to detecting that connectivity to the first storage device has been lost; and means for synchronizing the first storage device with respect to the second storage device, wherein the synchronizing comprises:

copying each of a plurality of values from the log to the first storage device, in the order in which the values were stored in the log.

16. The system of claim 13, further comprising:

means for inhibiting modification logging, in response to detecting that connectivity to the first storage device has been restored and the first storage device is synchronized with respect to the second storage device.

17. A computer readable storage medium comprising program instructions executable to:

apply to a first storage device a plurality of first modifications to information stored on a second storage device, and perform change tracking, wherein the change tracking comprises identifying regions of the first storage device that have values differing from values stored on the second storage device without identifying the order in which different regions are modified, and setting a bit in a bitmap for each identified region, wherein the bitmap comprises a plurality of bits, each bit corresponds to a respective region of the first storage device, and the bit is cleared when the respective region corresponding to the bit is synchronized with the second storage device;

detect that connectivity to the first storage device has been lost, wherein modification logging is inhibited prior to the time at which connectivity has been detected to have been lost;

perform the modification logging, wherein the modification logging is performed at a smaller granularity of information than the change tracking, the modification logging is enabled in response to detecting that the first storage device is inaccessible, the modification logging remains enabled until connectivity has been restored and the first storage device has been synchronized with respect to the second storage device, and the modification logging comprises:

detecting a plurality of second modifications to information stored on the second storage device, wherein information stored on the first storage device is a synchronized copy of the information stored on the second storage device, prior to the time at which the plurality of second modifications are applied to the second storage device; and storing information indicating an order in which the second modifications occur to the second storage device; and inhibit the modification application as long as the modification logging is enabled, in response to the detecting.

18. The computer readable storage medium of claim 17, wherein storing the information indicating the order in which the second modifications occur comprises:

storing a new value written to the second storage device in an entry in a log, wherein an order of entries within the log identifies the order in which the second modifications occur.

19. The computer readable storage medium of claim 18, wherein the program instructions are further executable to:

detect that connectivity to the first storage device has been restored, subsequent to detecting that connectivity to the first storage device has been lost; and synchronize the first storage device with respect to the second storage device, wherein synchronizing the first storage device comprises:

copying each of a plurality of values from the log to the first storage device, in the order in which the values were stored in the log.

20. The computer readable storage medium of claim 17, wherein the program instructions are further executable to:

inhibit modification logging, in response to detecting that the first storage device is accessible and synchronized with respect to the second storage device.

* * * * *